No. 748,849. Patented January 5, 1904.

UNITED STATES PATENT OFFICE.

ROBERT KENNEDY DUNCAN, OF WASHINGTON, PENNSYLVANIA, ASSIGNOR TO DUNCAN CHEMICAL COMPANY, A CORPORATION OF PENNSYLVANIA.

ORNAMENTED OR LETTERED GLASSWARE OR SIMILAR WARE.

SPECIFICATION forming part of Letters Patent No. 748,849, dated January 5, 1904.

Application filed January 6, 1903. Serial No. 138,050. (No specimens.)

*To all whom it may concern:*

Be it known that I, ROBERT KENNEDY DUNCAN, of Washington, in the county of Washington and State of Pennsylvania, have invented certain new and useful Improvements in Ornamented or Lettered Glassware or Similar Ware; and I do hereby declare the following to be a full, clear, and exact description of the invention, such as will enable others skilled in the art to which it appertains to make and use the same.

My invention relates to an improvement in ornamented or lettered glassware or similar ware.

The object of my invention is to produce articles made of glass or similar material having permanently formed thereon any desired designs, ornamentation, or lettering of material which is vitreous brilliant and of any desired tint or color, practically insoluble in hot or cold water, and capable of withstanding ordinary variations of temperature without being cracked or injured.

With this object in view my invention consists in an article made of glass or similar material having formed on its surface and chemically united therewith any design, figure, ornamentation, or letter composed of a product resulting from the chemical reaction of lead oxid and boric acid, each in the proportion substantially as hereinafter specified.

In carrying out my invention I first manufacture a substance which I have designated as a "lead subborate." It is preferably made by fusing at a low temperature a mixture of a compound of lead, such as litharge or red lead or lead nitrate, with boric acid, either fused or crystalline, or the material can be made by precipitation. I have used all of the above substances and have ascertained that they are preferably used in approximately the following proportions: litharge, (PbO,) 111.5, or red lead, (Pb$_3$O$_4$,) 113.8, or lead nitrate, Pb(NO$_3$)$_2$, 165.5, mixed with boric acid, crystalline, (H$_3$BO$_3$,) thirty-one, or boric acid, fused, (B$_2$O$_3$,) 17.5. These substances mixed in the foregoing equivalent proportions yield an identical result, with this exception, that when lead nitrate is used the color of the resulting product is somewhat improved. Instead of using only one of the lead compounds referred to two of them may be mixed and used with advantage. Thus a mixture may be employed which consists of lead nitrate, 17.5; litharge, one hundred, and boric acid, (crystalline,) thirty-one. The lead subborate produced by the fusion of any one of these several mixtures consists of a transparent highly refractive yellow-tinted glass-like mass and almost colorless in thin layers. It has, however, an extraordinary power of dissolving coloring materials—as, for example, metallic oxids—and the resultant may then present a very beautiful color.

The amount and kind of coloring-matter that is employed will depend on the kind and depth of color that may be desired. For example, the following proportions may be used for the production of blue ornamentation or lettering: litharge, one hundred and twelve; boric acid, thirty-four; cobalt carbonate, 2.6; nickel oxid, 0.1. For the production of emerald-green ornamentation, figures, or letters the following proportions may be employed: lead nitrate, 165.5; boric acid, thirty-three; cupric oxid, 3.2, and chromium oxid, 0.08. Other colors—such as black, claret, copper, &c.—may be produced by using suitable inorganic oxids and salts. To produce an opaque enamel, the lead borate is mixed with the oxids of antimony, arsenic, tin, &c., in the proper proportions. By mixing the enameling substance with the coloring substances an opaque colored enamel is produced. For example, the oxids of copper and cobalt mixed with the oxid of arsenic in the proper proportions will produce a turquoise enamel. By very careful heating of the lead borate it is possible to make it take the enamel condition without the necessity of adding any of the enameling oxids—such as antimony, arsenic, &c.

In order to produce designs, letters, or any desired ornamentation on the glass, a stencil-plate provided with the desired design or letters is applied to the surface of the hot article and the powdered lead subborate is shaken over the stencil until a sufficient amount has entered the spaces therein to produce the desired letters, figures, or ornamentation, and then the stencil-plate is at once removed. The powdered lead subborate quickly melts and produces the lettering or design formed of a smooth, brilliant, vitreous surface the outlines of which are maintained sharp and clearly cut by the walls of the stencil-plate, as the mixture will not flow after the stencil has been removed. The article may have the letters, design, or ornamentation formed in its surface during the process of molding, and such sunken or depressed portions may be filled with the powdered lead subborate, a stencil-plate being used to prevent the powder from coming in contact with any portion of the surface excepting the sunken portions constituting the letters or design. In such case the letters or designs are formed with their outer surfaces flush with the outer surfaces of the article. Instead of producing depressed or sunken letters or ornamentation in the surface of the article the letters or ornamentation may be formed of raised surfaces and the composition be applied to and fused upon such raised surfaces.

Instead of shaking the powder onto the stencil-plate it is obvious that it may be blown on with an air-blast, and it may be applied with a brush as a paint.

If desired, the stencil could be formed as parts of the mold, so that the powder could be applied to the stencil by merely opening a door in the mold and blowing in the powder with an air-blast.

The lead subborate is vitreous, transparent, and brilliant. It is capable of being rendered non-transparent or enamel-like. It is practically insoluble in hot or cold water. Its coefficient of expansion and contraction is approximately the same as glass, so that when applied it will not break or crack to pieces. It has the power of dissolving metallic oxids and salts to produce any desired colors. It unites chemically with glass and causes the designs or letters to be securely and permanently united therewith. It is capable of being removed from the glass. It is comparatively inexpensive to manufacture and may be applied at slight cost and without materially delaying the ordinary process of manufacture, and it is capable of fusion at a temperature not higher than the maximum temperature of the leers or annealing-ovens.

Glass bottles or other articles ordinarily have sufficient heat stored in them when removed from the mold to instantly fuse the lead subborate when applied to its surface. In the event the article should cool to such an extent after its removal from the molds as to prevent a perfect fusion of the compound when applied thereto its complete fusion will be effected by the temperature at the entrance of the leers, which is about 800° Fahrenheit and to which the article is subjected for a period of about twelve minutes in ordinary practice. However, neither the temperature of the article itself nor that of the leers is sufficiently great to cause the compound to flow. It will simply fuse and produce the letters or designs formed by the stencil.

The letter, designs, or ornamentation applied in the manner hereinbefore set forth present an exceedingly hard, polished, and highly-brilliant surface which may be of any desired tint or color and constitute a pleasing and artistic appearance and design.

I make no claim in this application to the method of manufacturing the improved article nor to the material employed in producing the ornamentation, designs, or lettering thereon, as such subjects-matter of invention are claimed in separate applications filed of even date herewith.

Having fully described my invention, what I claim as new, and desire to secure by Letters Patent, is—

A glass article having fused to its face, a decoration consisting of the product resulting from the chemical reaction of lead oxid and boric acid, each in the proportions substantially as specified.

In testimony whereof I have signed this specification in the presence of two subscribing witnesses.

ROBERT KENNEDY DUNCAN.

Witnesses:
GEO. F. DOWNING,
S. G. NOTTINGHAM.